United States Patent
Lundschen

(10) Patent No.: US 10,029,183 B2
(45) Date of Patent: *Jul. 24, 2018

(54) FANTASY SPORTS METHOD, SYSTEM, AND SOFTWARE

(71) Applicant: Axiom 316, Limited, Albuquerque, NM (US)

(72) Inventor: Dean Lundschen, Albuquerque, NM (US)

(73) Assignee: Axiom 316, Limited, Albuquerque, NM (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/331,628

(22) Filed: Oct. 21, 2016

(65) Prior Publication Data

US 2017/0036122 A1    Feb. 9, 2017

Related U.S. Application Data

(63) Continuation of application No. 14/156,056, filed on Jan. 15, 2014, now Pat. No. 9,474,960.

(60) Provisional application No. 61/752,539, filed on Jan. 15, 2013.

(51) Int. Cl.
| | |
|---|---|
| *A63F 13/00* | (2014.01) |
| *G06F 17/00* | (2006.01) |
| *A63F 13/828* | (2014.01) |
| *A63F 13/30* | (2014.01) |

(52) U.S. Cl.
CPC ............ *A63F 13/828* (2014.09); *A63F 13/12* (2013.01); *A63F 13/30* (2014.09); *A63F 2300/8052* (2013.01); *G06F 17/00* (2013.01)

(58) Field of Classification Search
None
See application file for complete search history.

(56) References Cited

U.S. PATENT DOCUMENTS

| | | |
|---|---|---|
| 8,210,916 B2 | 7/2012 | Ma et al. |
| 8,246,433 B2 | 8/2012 | Lore |
| 8,509,929 B1 | 8/2013 | Hughes et al. |
| 2006/0217198 A1 | 9/2006 | Johnson |
| 2007/0265048 A1 | 11/2007 | Winsick |
| 2009/0111582 A1 | 4/2009 | Schuler et al. |
| 2009/0203447 A2 | 8/2009 | Hansen et al. |
| 2010/0184495 A1 | 7/2010 | Levy et al. |
| 2012/0149473 A1 | 6/2012 | Moore et al. |
| 2012/0270619 A1 | 10/2012 | Nicholas et al. |
| 2012/0289340 A1 | 11/2012 | Pawson |
| 2013/0079073 A1 | 3/2013 | Sharifi |

*Primary Examiner* — James S McClellan
*Assistant Examiner* — Syvila Weatherford
(74) *Attorney, Agent, or Firm* — Jeffrey D. Myers; Justin R. Jackson; Peacock Law P.C.

(57) ABSTRACT

A method of using, computer software implementing, and a system for allowing a fantasy sports contest application to provide to a user the ability to substitute bench players for active players while a corresponding live game is in progress comprising establishing a position clock for each player, subtracting times from the position clocks as a stat feed entry is received, for each player adding active points for active players and inactive points for bench players, and scoring to the user only active points at the end of the game.

7 Claims, 8 Drawing Sheets

Figure 6   1st player active points + 2nd player active points = Total position active points

FANTASY SPORTS METHOD, SYSTEM, AND SOFTWARE

CROSS-REFERENCE TO RELATED APPLICATIONS

This application is a continuation application of U.S. patent application Ser. No. 14/156,056, filed on Jan. 15, 2014, now U.S. Pat. No. 9,474,960, which claimed priority to and the benefit of the filing of U.S. Provisional Patent Application Ser. No. 61/752,539, entitled "Fantasy Sports Method, System, and Software", filed on Jan. 15, 2013, and the specifications and claims thereof are incorporated herein by reference.

STATEMENT REGARDING FEDERALLY SPONSORED RESEARCH OR DEVELOPMENT

Not Applicable.

INCORPORATION BY REFERENCE OF MATERIAL SUBMITTED ON A COMPACT DISC

Not Applicable.

COPYRIGHTED MATERIAL

Not Applicable.

BACKGROUND OF THE INVENTION

Field of the Invention (Technical Field)

The present invention relates to methods, systems, and software for managing fantasy sports leagues.

Description of Related Art

Existing fantasy sports leagues applications provide no ability to make changes to rosters in real time. The present invention provides a manner in which to incorporate such abilities that is both technically enabled and useful in the context of league rules and scoring.

BRIEF SUMMARY OF THE INVENTION

A method of using, computer software implementing, and a system for allowing a fantasy sports contest application to provide to a user the ability to substitute bench players for active players while a corresponding live game is in progress, comprising: establishing a position clock for each player; subtracting times from the position clocks as a stat feed entry is received; for each player, adding active points for active players and inactive points for bench players; and scoring to the user only active points at the end of the game. In the preferred embodiment, the following are additionally provided for: providing a position place holder if the user moves an active player to being a bench player without substituting a bench player for the active player's position; not adding active points for a newly substituted active player for the stat feed immediately following the substitution; adding additional time to the position clocks if an overtime occurs in the corresponding live game; allowing a position clock timer to expire even though the corresponding live game has ended; and stopping a position clock when a corresponding live game ends. The fantasy sports contest can be any sport with a plurality of players.

Further scope of applicability of the present invention will be set forth in part in the detailed description to follow, taken in conjunction with the accompanying drawings, and in part will become apparent to those skilled in the art upon examination of the following, or may be learned by practice of the invention. The objects and advantages of the invention may be realized and attained by means of the instrumentalities and combinations particularly pointed out in the appended claims.

BRIEF DESCRIPTION OF THE SEVERAL VIEWS OF THE DRAWINGS

The accompanying drawings, which are incorporated into and form a part of the specification, illustrate one or more embodiments of the present invention and, together with the description, serve to explain the principles of the invention. The drawings are only for the purpose of illustrating one or more preferred embodiments of the invention and are not to be construed as limiting the invention. In the drawings.

DETAILED DESCRIPTION OF THE INVENTION

Figure 1:
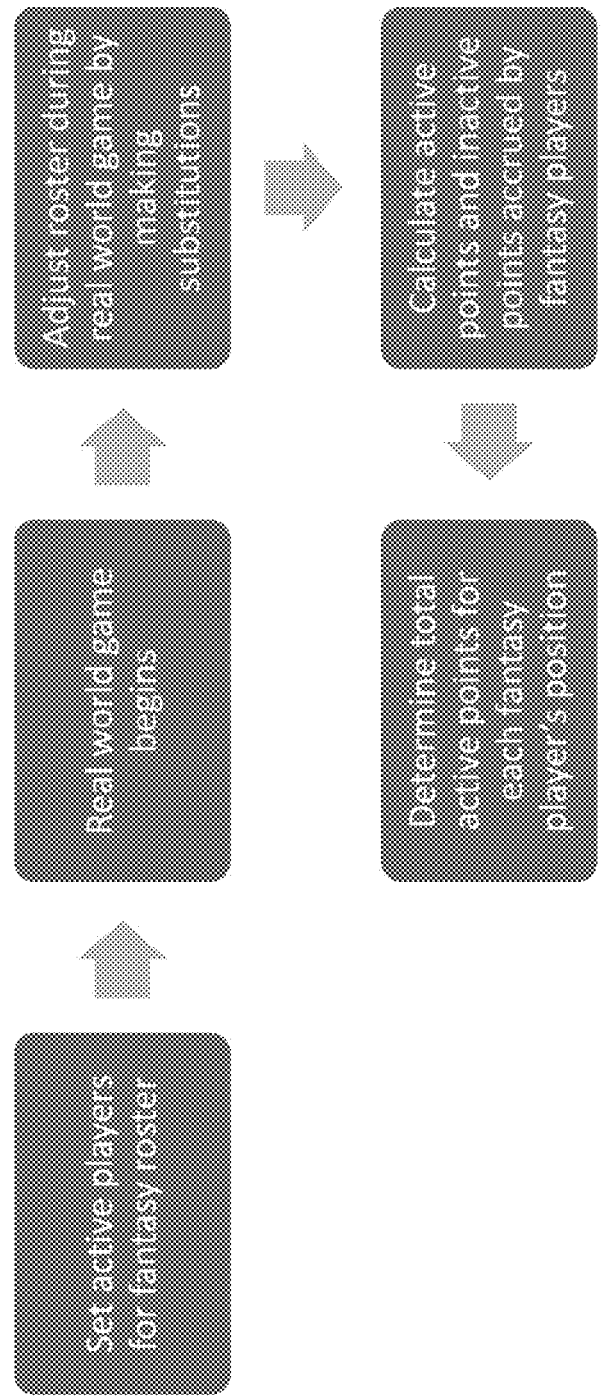
FIG. 1 provides an overview of the process of the invention.

The present invention is of a method, system, and computer software embodied on non-volatile computer-readable media for engaging in fantasy sports activities, particularly in managing a league involving multiple players each handling a single team.

The following describes how this invention applies to fantasy sports league management systems. This assumes the framework of the current fantasy model whereas fantasy player results are derived from real world player game performances. This system will allow fantasy owners in leagues to substitute bench players for active players on their roster while the game is in progress. The present invention preferably comprises three major components: a time sync mechanism, a substitution mechanism, and a substitute scoring mechanism. These components allow owners to maximize their rosters by using multiple players to generate active points for each position. After a substitution, the owner must forfeit the points and time for that player's statistical feed. Statistical feeds include time stamps which allow the invention to create a position clock that is defined as the time a player could possibly play in a real world game for their position.

For purposes of the specification and claims, the following terms are defined as stated. Active Points: points and/or stats accrued by a player while they are active on the fantasy roster. Inactive Points: points and/or stats accrued by a player while they are on the fantasy roster bench. Position Clock: the amount of time a player could possibly play in a real world game for their position. Stat Feed: a play by play description of what occurred during the time period. Real time world clock: the time associated in real life as opposed to the time in a game for fantasy driven clock.

The present invention provides a method of playing fantasy football that allows substitutions while the game is in progress. The invention utilizes a position clock, which is defined as the amount of real world time a player could possibly play in a game. Each player's position preferably has its own position clock. The invention creates a time sync mechanism (TSM) that subtracts time from the position clock as play by play statistical game feeds come in while the game is in progress. When an owner makes a substitution they agree to forfeit time and/or points in the near future after making the substitution. When a player is active on the roster stats and points are accrued to the active stats and points of the position until a substitution for that player occurs. When a player is inactive on the roster (on the bench) stats and points are accrued to the inactive stats and points of the position. A position place holder provides a method of maintaining a valid line up if an owner decides to remove a player from an active position without a substitution to allow player minutes in that position to be saved for use at a later time.

The invention is based on the current model of fantasy football (as well as other sports) in which the player "owners" participate in an online fantasy league. The league is created by a commissioner who is also a participant in the league and acts as a league manager and oversees the league operation. The commissioner creates the league based upon a set of rules that all participants agreed to follow. These rules determine the scoring parameters as well as game play boundaries. The owners then draft real world players to their team to create what is known as a fantasy team. As the real world players participate in real world games, their performance dictates the score of the fantasy player's team based on the leagues customized scoring format. Usually, an owner in a league competes against another owner in the same league in a head to head format which produces a win loss record that determines the playoff participants at the end of the fantasy regular season. A fantasy competition is based on the accumulated points generated by each teams "active" player's statistical performance for that week. The fantasy team who generated the most fantasy points during that week's real world competition wins the head to head matchup for that particular week. It is important to take note that owners cannot make changes to their active or "starting lineup" once the real world player's real world games start. The present invention allows owners to substitute active fantasy players with inactive fantasy (bench) players from their team as the real world players participate in the real world games. This invention incorporates a regulatory mechanism that sustains the "substitution" concept as viable and equitable for the competitive interests of the participants. This affords fantasy players greater flexibility and control over the outcome of the fantasy competition greatly enhancing the fantasy gaming experience.

Referring to FIG. 1, owners setup their roster by preselecting the players they want to be active (starting) during the real world game day. The real world game begins and active players begin to accrue points based on their real world performance. Depending on game time situations and events the owner may decide to replace an active player by substituting them with an inactive player from their bench roster. Once the inactive bench player becomes the active player the scores must be calculated differently. Since the previously active player becomes inactive that player cannot accrue anymore points for their team while in an inactive or "benched" status however the unleashed system will keep track and display the inactive and active points as a reference. The newly activated fantasy player starts to accrue points for the fantasy team. As the competition progresses the unleashed system will calculate all the individual active points accrued by the multiple fantasy players who participated in that particular fantasy roster position and apply the points toward a the total score for that team.

Figure 2:
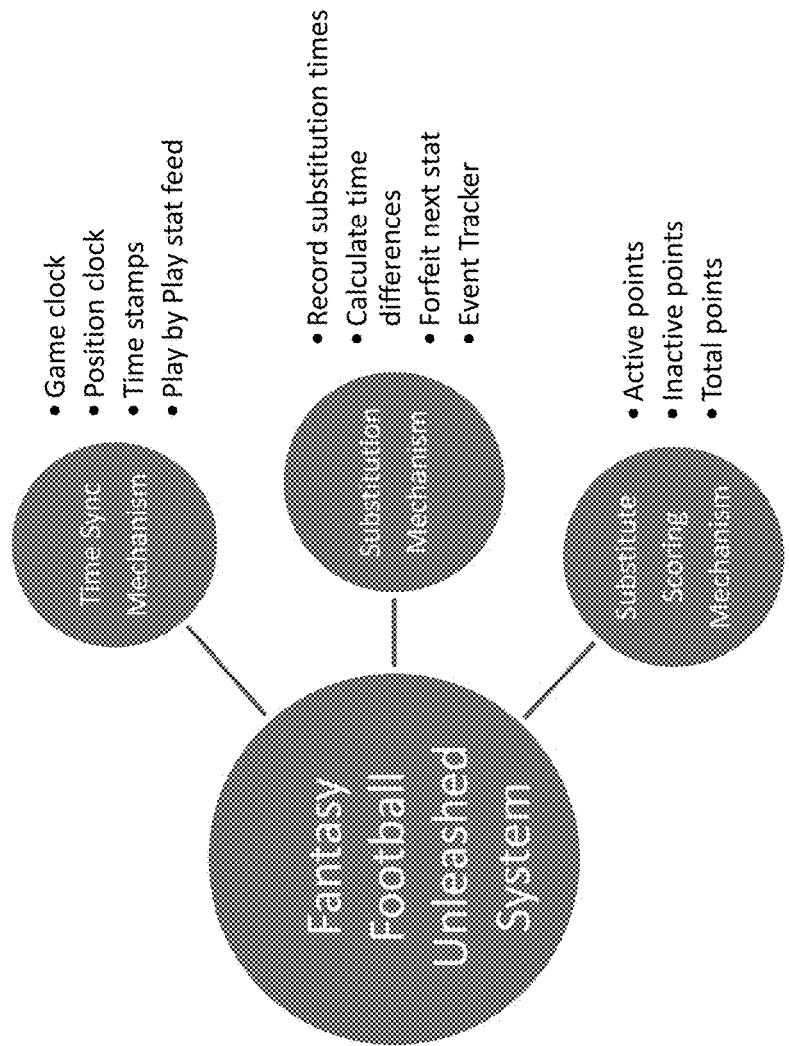
FIG. 2 illustrates the preferred configuration of a system according to the invention.

Referring to FIG. 2, in order to accomplish the "substitution" capabilities, the fantasy football unleashed system of the invention employs three major elements to manage the new features. The elements are referred to as the Time Sync Mechanism (TSM), the Substitute Mechanism (SM) and the Substitute Scoring Mechanism (SSM).

Figure 3:
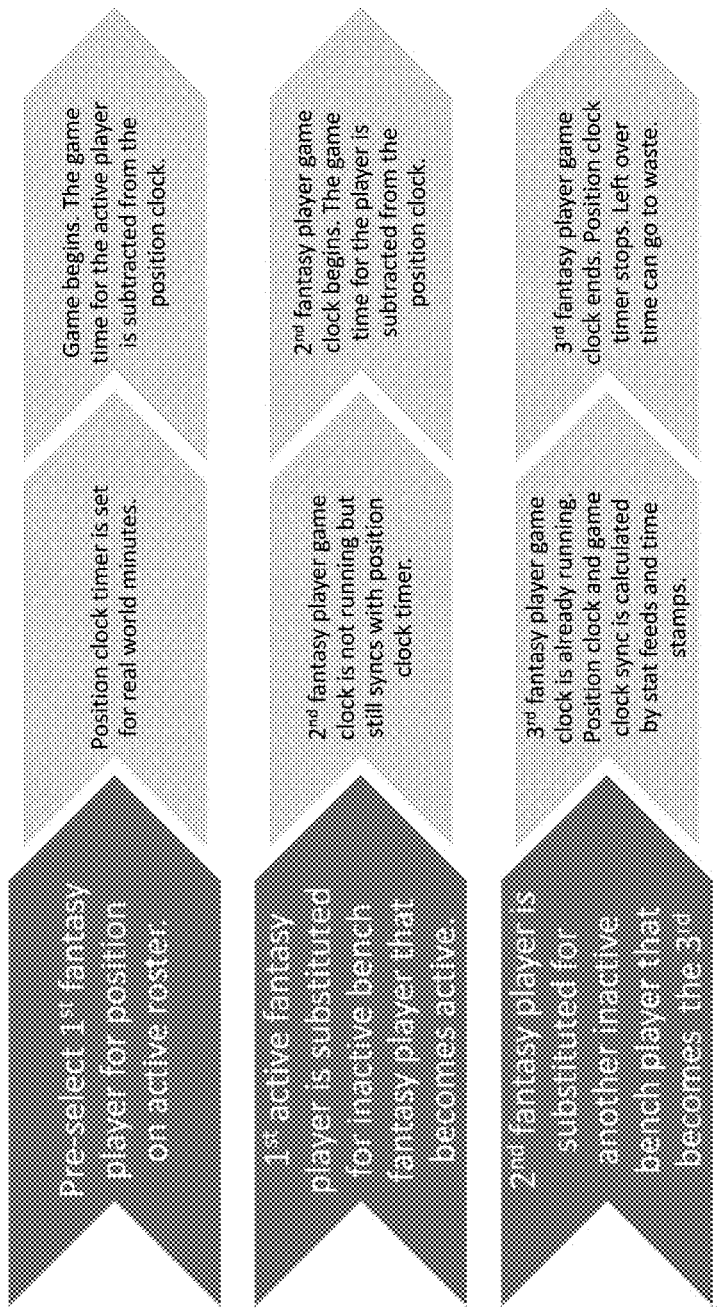
FIGS. 3 and 4 illustrate the preferred Time Sync Mechanism according to the invention.
Figure 4:
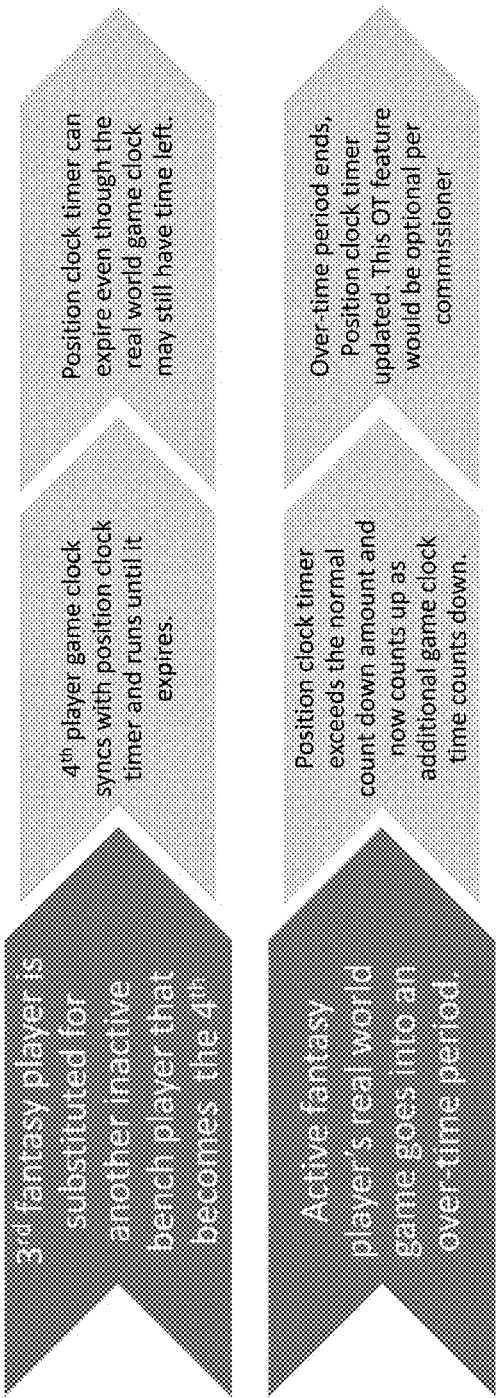

Referring to FIGS. 3-4, the element referred to as the "Time Sync Mechanism (TSM)" allows multiple substitutions to take place for a particular position. There are preferably three components to the TSM that allow substitutions to take place: the position clock, the game clock, and the play by play game statistics ("stats") feeds. The "position clock" is a timer that accounts for all the real time minutes a real world player could play. For example, a football wide receiver could potentially play 4-15 minute quarters for a total sum of 60 minutes. A basketball player could potentially play 4-12 minute quarters for a total sum of 48 minutes. The "position clock" would start at the total sum of the potential real world player minutes. The "game clock" is associated with the real world player's game clock. As a fantasy player is active on the roster accruing points his "position clock" will reflect real world minutes being subtracted as the "game clock" counts down. The fantasy team position itself is regulated by the "positional clock", not the player's real world game clock as is currently the status quo, thus creating the ability to make multiple fantasy player substitutions for that position while sustaining the integrity of the fantasy game. Each fantasy team position is timed independently by its own "positional" clock which links up independently to the real world player clock that occupies that position. The play by play game feed stats have a time stamp which are recorded during this phase so that they may be used as a reference point to calculate the time elapsed between real world plays.

Figure 7:
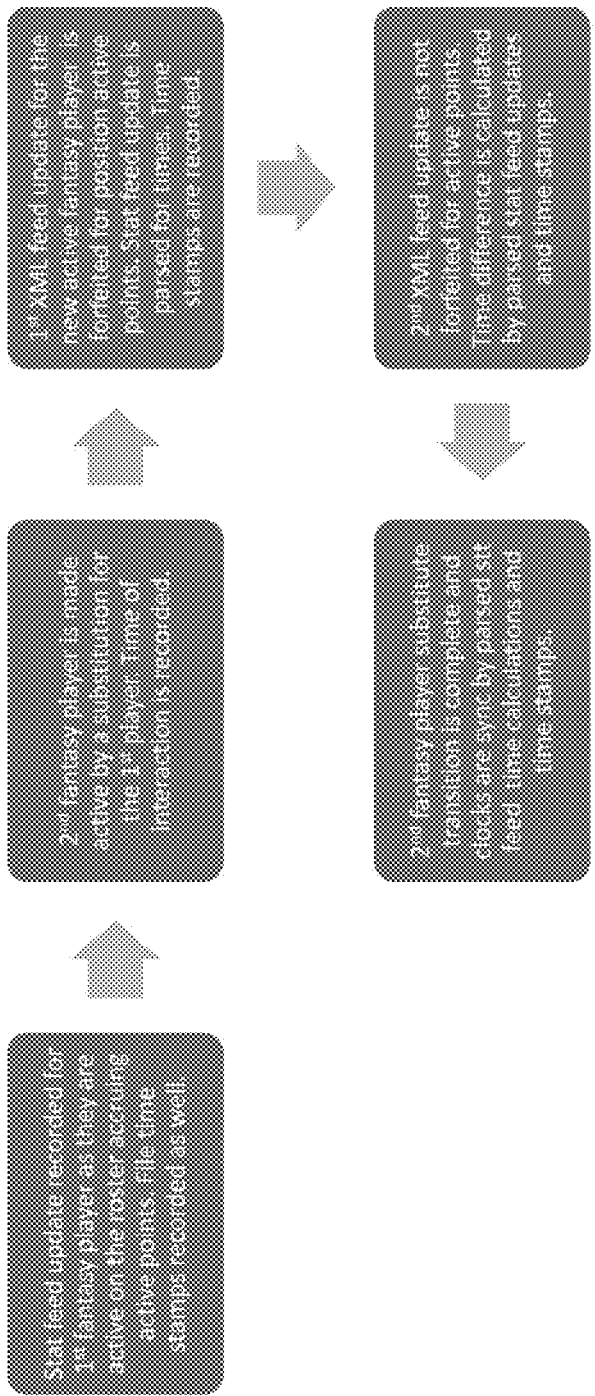
FIG. 7 illustrates the preferred time/event transition process of the invention.

FIG. 7 represents how the time sync/event transition would occur. The stat play by play game feed will show the game clock time for that particular player's game. Based on the time the fantasy player is put on the active roster we can determine whether they should be accruing active points (APs) or inactive points (IPs). Since the 1st fantasy player was pre-selected they start accruing APs once the game clock starts. When a substitution is made, the incoming player's "game clock" time is recorded; the owner also agrees to forfeit the next stat feed update (the next play the newly substituted player's team executes). This is done to avoid participants having the opportunity to substitute a player after seeing the outcome or potential outcome of a play. For instance one might have time to substitute a player as they observe a long running play which may take 8-10 seconds to complete. If a play is reviewed this may bring about a delay that may afford a participant time to substitute the player involved while the play is under review. The solution is to disallow the results of the first play executed by the newly substituted player's team. This is the first play that is run after the substitution request is received and acknowledged by the unleashed substitution mechanism. The next stat feed is updated and now the fantasy player for the same position begins to accrue APs. The original starting fantasy player only accrues IPs now. Using the time of the substitution made by the owner and the time of the game clock in the play by play feed we can determine how much time needs to be taken off the position clock. This definition details why it is not just a time sync but an event sync. It is based on the next event of the fantasy player.

Figure 5:
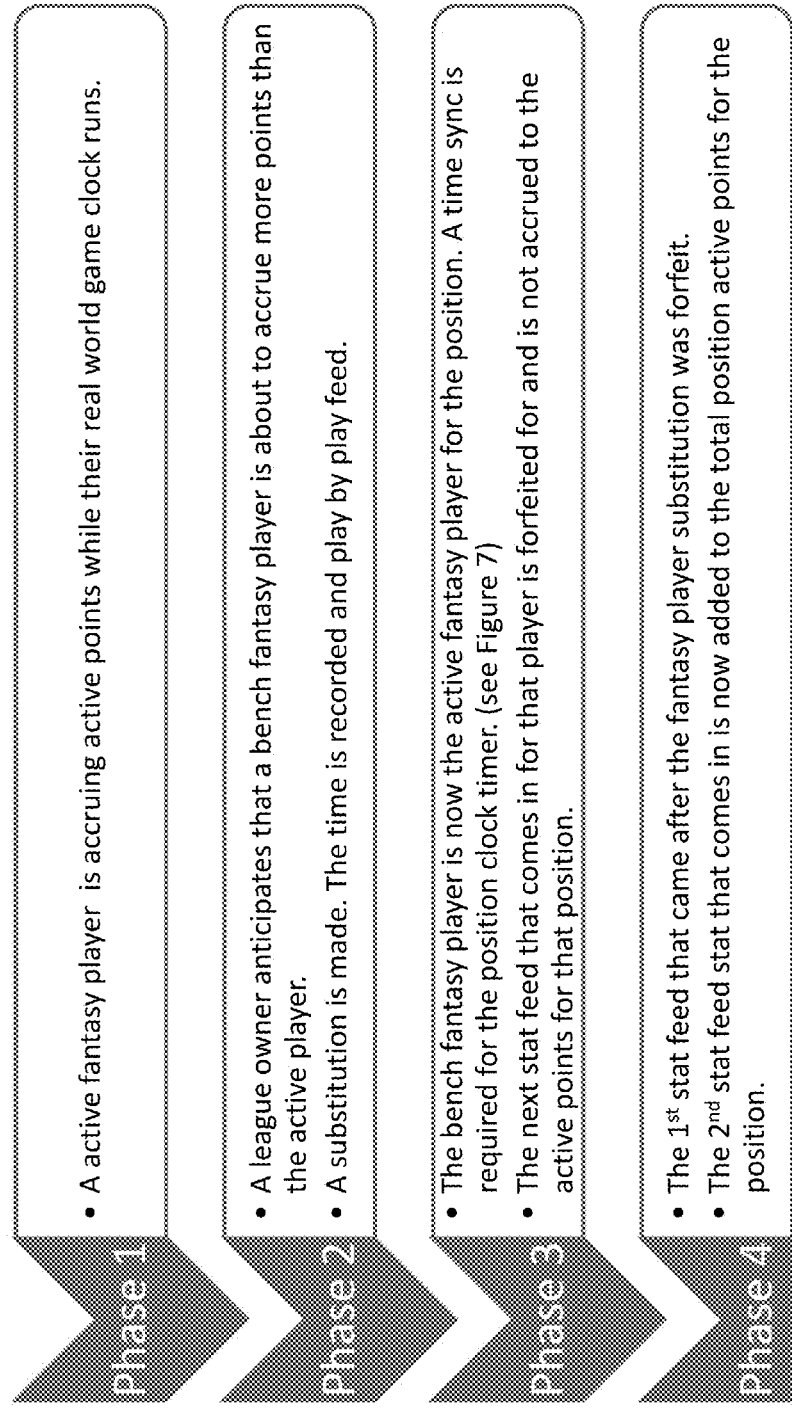
FIG. 5 illustrates the preferred Substitute Mechanism according to the invention.

FIG. 5 illustrates the preferred "Substitution Mechanism (SM)" of the invention, which allows the owner to make a substitution. When an owner decides to substitute an active player with an inactive player the SM will record the time the substitution was made. By recording this time change and referencing the appropriate stat feed we can calculate time difference of when an owner's fantasy player should be actively accruing points from real world player performance. Again, the owner agrees to forfeit any active points the next stat feed may provide for the newly substituted player.

Figure 6:
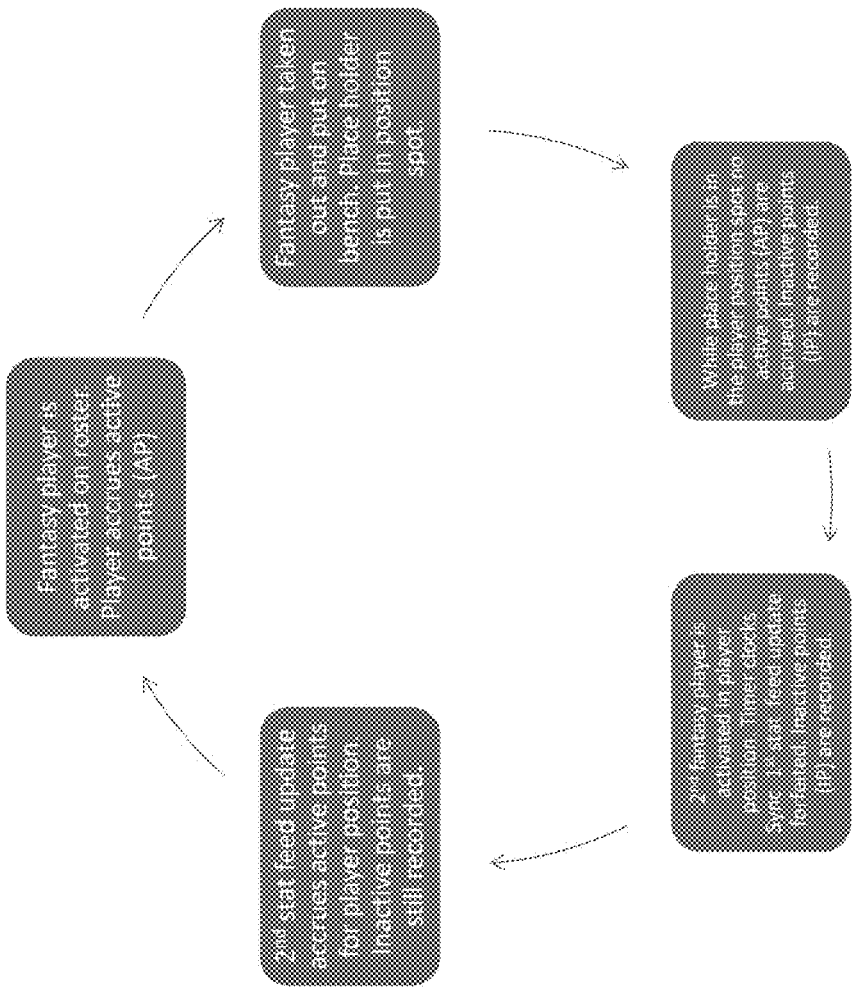
FIG. 6 illustrates the preferred Substitute Scoring Mechanism according to the invention.

FIG. 6 illustrates the preferred "Substitute Scoring Mechanism (SSM)" which keeps track of the points scored per position. For example, while a fantasy player is active on the roster in the game they are accruing active points (APs) for their real world performance. When they are substituted and go inactive to the bench, they only accrue inactive points (IPs) instead of APs. Therefore if one made three substitutions for that position during the time allotted by the "position clock" then the scoring would be calculated such as 1st fantasy player APs+2nd fantasy player APs+3rd fantasy player APs=total position APs. The IPs are also recorded and may be viewed for informational purposes however don't count towards the total score for that position.

Figure 8:
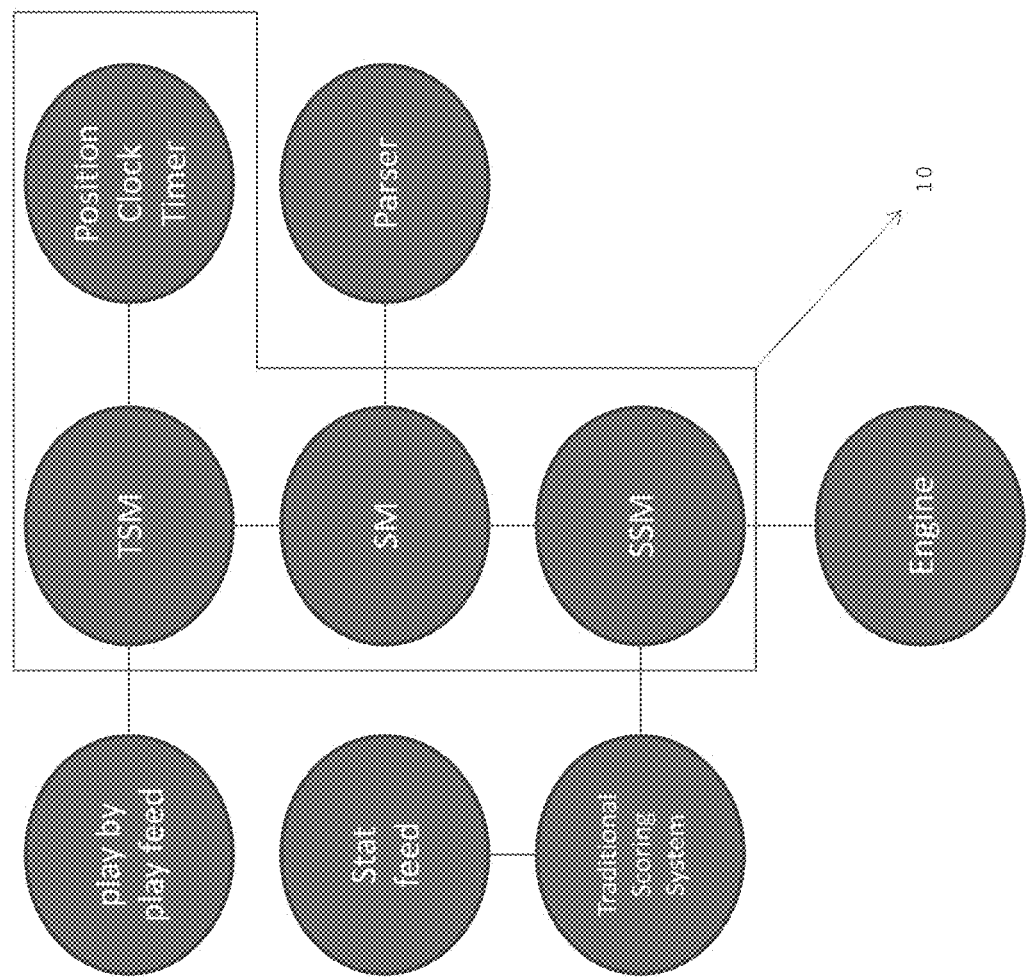
FIG. 8 is a schematic diagram of the placement of the invention within an overall fantasy sports league system.

FIG. 8 illustrates the placement of the invention 10 within a system for providing fantasy sports leagues, and comprising the TSM, SM, SSM, and Position Clock Timer previously described.

To better understand the invention, consider the following example stat feed (Table 1), which is representative of such feeds:

TABLE 1

Example of a dissected play by play stat feed

| Regular expression to parse | Item Description |
|---|---|
| 1-10 | Represents the Down |
| -CIN 25 | Represents the Position on the field |
| CIN 33 | Represents the New position on the field |
| for 8 yards | Represents the change in yards |
| (7:03) | Represents the game clock; time remaining |
| 14-A. Dalton pass incomplete deep middle to | Represents $1^{st}$ offensive player involved Represents the play summary |
| 84-J. Gresham | Represents $2^{nd}$ offensive player involved |
| 32-E. Weddle | Represents $1^{st}$ defensive player |
| (shotgun) | Represents offensive formation |
| TOUCHDOWN | Represents a score |

1-10-CIN 25 (7:03) 14-A. Dalton pass|incomplete deep middle to 84-J. Gresham.
2-10-CIN 25 (6:58) 25-G. Bernard left end to CIN 33 for 8 yards (32-E. Weddle).
3-2-CIN 33 (6:13) 25-G. Bernard left end to CIN 36 for 3 yards (71-L. Guy).
1-10-CIN 36 (5:41) (shotgun) 14-A. Dalton pass short left to 85-T. Eifert to CIN 45 for 9 yards (31-R. Marshall).
... (Omitted feeds) ...
2-8-SD 21 (1:47) (shotgun) 14-A. Dalton pass deep middle to 18-A. Green for 21 yards, TOUCHDOWN.

The above stat feed illustrates how stat feeds can be parsed to extract information out of them. We are particularly interested the game clock section of the feed which records the elapsed time from play to play. Each time a new stat feed comes in with a new game clock stamp we are able to subtract the time from the player position clock.

As a concrete example of operation of the invention for TSM, SM, and SSM, consider the following Table 2:

TABLE 2

| Real time world clock | Description of Events | | Play by Play Stat Feed in the $3^{rd}$ Quarter | Extra Notes |
|---|---|---|---|---|
| 12:45:00 pm | Fantasy owner currently has RB1 (BJGE) as active. Wants to substitute RB2 (Bernard) into same RB position in roster. | | 1-10-CIN 25 (7:03) 14-A. Dalton pass incomplete deep middle to 84-J. Gresham. | |
| 12:47:00 pm | TV Commercial break | | Time out called. Go to commercial break. | |
| 12:48:00 pm | Fantasy owner uses unleashed system to make the substitution during the TV break. | | TV commercials are still playing on air. | |
| 12:48:00 pm | 1) | FFU engine engages by recording sub time. | TV commercials are over and the game is about to begin again. | The position clock is set to 60 minutes for a NFL game. Since 2 15 minute quarters and 7:57 has passed in the $3^{rd}$ quarter (noted by the game stamp of 7:03) the position clock shows 60:00 − 37:57 = 22:03 |
| | 2) | Retrieves player's position clock 22:03 | | |
| | 3) | Retrieves player's most recent play by play feed. (7:03) | | |
| 12:54:05 pm | 4) | Retrieves player's next play by play feed (6:58). | 2-10-CIN 25 (6:58) 25-G. Bernard left end to CIN 33 for 8 yards (32-E. Weddle). | $1^{st}$ game stamp time shows 7:03 $2^{nd}$ game stamp time shows 6:58 |
| 45 second span | 5) | Calculate forfeited time to take off position clock using the difference of game time stamps in both feeds. | | 7:03 − 6:58 = :05 seconds for this last play. 8 yards is forfeited. :05 seconds are forfeited. Position clock shows 22:03 − :05 = 21:58 |

TABLE 2-continued

| Real time world clock | Description of Events | Play by Play Stat Feed in the 3$^{rd}$ Quarter | Extra Notes |
|---|---|---|---|
| | 6) | If the player accrues points in the following feed after the substitution send to inactive points as forfeited. | |
| 12:55:00 pm | 7) | Next play by play feed is now considered valid to apply towards active points. | 3-2-CIN 33 (6:13) 25-G. Bernard left end to CIN 36 for 3 yards (71-L. Guy) | 1$^{st}$ game time stamp shows 6:58 2$^{nd}$ game time stamp shows 6:13 6:58 − 6:13 = 45 seconds Position clock shows 21:58 − :45 = 21:13 3 yards are added to active position stats. |

Next consider the following examples of scoring calculations according to the invention (Table 3). In this example, the total minutes a QB could play in a game are 60. The owner has 3 different QBs on his team defined as player 1, 2 and 3. In traditional fantasy sports you cannot change the player during the game so you will always record all of the points for that player. In our system points are only recorded for a player while he is active on the fantasy roster and not on the bench. Our system provides a method for substituting a player during the game so we must keep track of points they did earn while active and did not earn while they remove that player from the active roster.

Player 1 (11)+Player 2 (8)+Player 3 (20)=Position (39) total points

TABLE 3

| Owner | Position playing time | Active points | Inactive points | Total points |
|---|---|---|---|---|
| Player 1 | 15 min | 11 | 5 | 16 |
| Player 2 | 15 min | 8 | 3 | 11 |
| Player 3 | 30 min | 20 | 5 | 25 |
| total | 60 min | 39 | 13 | 52 |
| | | 39 points recorded | 13 Not recorded | Potential points |

Table 4 provides a team view in respect to scoring based on the owner's decisions. Take note how each position adds up to 60 minutes. Based on the owner's decisions, not all potential points were given to the total recorded points for the owner's team.

TABLE 4

| | Time | Active Points | Inactive Points | Recorded Score |
|---|---|---|---|---|
| QB 1 | 30 min | 20 | 10 | 20 |
| QB 2 | 30 min | 13 | 3 | 13 |
| WR 1 | 45 min | 12 | 6 | 12 |
| WR 2 | 15 min | 7 | 0 | 7 |
| TE 1 | 20 min | 0 | 22 | 0 |
| TE 2 | 40 min | 9 | 3 | 9 |
| K 1 | 60 min | 3 | 3 | 3 |
| Def 1 | 60 min | 8 | 0 | 8 |
| RB 1 | 10 min | 6 | 5 | 6 |

TABLE 4-continued

| | Time | Active Points | Inactive Points | Recorded Score |
|---|---|---|---|---|
| RB 2 | 20 min | 7 | 4 | 7 |
| RB 3 | 30 min | 12 | 9 | 12 |
| | | | 65 Lost points | 97 total points |

In the preferred embodiment, and as readily understood by one of ordinary skill in the art, the apparatus according to the invention will include a general or specific purpose computer or distributed system programmed with computer software implementing the steps described above, which computer software may be in any appropriate computer language, including C++, FORTRAN, BASIC, Java, assembly language, microcode, distributed programming languages, etc. The apparatus may also include a plurality of such computers/distributed systems (e.g., connected over the Internet and/or one or more intranets) in a variety of hardware implementations. For example, data processing can be performed by an appropriately programmed microprocessor, computing cloud, Application Specific Integrated Circuit (ASIC), Field Programmable Gate Array (FPGA), or the like, in conjunction with appropriate memory, network, and bus elements.

Note that in the specification and claims, "about" or "approximately" means within twenty percent (20%) of the numerical amount cited. All computer software disclosed herein may be embodied on any non-transitory computer-readable medium (including combinations of mediums), including without limitation CD-ROMs, DVD-ROMs, hard drives (local or network storage device), USB keys, other removable drives, ROM, and firmware.

Although the invention has been described in detail with particular reference to these preferred embodiments, other embodiments can achieve the same results. Variations and modifications of the present invention will be obvious to those skilled in the art and it is intended to cover in the appended claims all such modifications and equivalents. The entire disclosures of all references, applications, patents, and publications cited above are hereby incorporated by reference.

What is claimed is:

1. A non-transitory computer-readable medium comprising computer software for using a fantasy sports contest application to provide to a user the ability to substitute bench players for active players while a corresponding live game is in progress, where the computer software is executed on a plurality of computers in conjunction with memory, bus elements and network, the computer software comprising:

- code establishing a position clock for each starting fantasy position;
- code subtracting times from the position clock as a stat feed entry is received;
- code permitting substitution of a bench player for an active player at a time when a game clock of the live game is not stopped;
- code, that for each player, adds active points for active players and inactive points for bench players;
- code scoring to the user only active points at the end of the game; and
- code requiring a forfeit period corresponding to a next single stat feed update of the live game, where the next single stat feed update reports time and/or points generated by the bench player substituted into the game such that the time and/or points are forfeited after the substitution of the bench player for the active player at a time when a game clock of the live game is not stopped.

2. The medium of claim 1 additionally comprising code providing a position place holder if the user moves an active player to being a bench player without substituting a bench player for an active player's position.

3. The medium of claim 1 additionally comprising code not adding active points for a newly substituted active player for the stat feed immediately following the substitution.

4. The medium of claim 1 additionally comprising code adding additional time to the position clock if an overtime occurs in the corresponding live game.

5. The medium of claim 1 additionally comprising code allowing a position clock timer to expire even though the corresponding live game has not ended.

6. The medium of claim 1 additionally comprising code stopping the position clock when a corresponding live game ends.

7. The medium of claim 1 wherein the fantasy sports contest comprises any sport with a plurality of players.

* * * * *